Oct. 15, 1968

KOJI SHO 3,406,270

SWITCH CONTROL COMPRISING A ROTATABLE RING PIVOTING
A T-SHAPED LEVER FOR A MINIATURE TYPE
MOTOR-DRIVEN INSTRUMENT

Filed Oct. 27, 1966

KOJI SHO 3,406,270

SWITCH CONTROL COMPRISING A ROTATABLE RING PIVOTING
A T-SHAPED LEVER FOR A MINIATURE TYPE
MOTOR-DRIVEN INSTRUMENT

Filed Oct. 27, 1966

United States Patent Office 3,406,270
Patented Oct. 15, 1968

3,406,270
SWITCH CONTROL COMPRISING A ROTATABLE RING PIVOTING A T-SHAPED LEVER FOR A MINIATURE TYPE MOTOR-DRIVEN INSTRUMENT
Koji Sho, Yokohama-shi, Japan, assignor to Nippon Kogaku K.K., Tokyo, Japan, a corporation of Japan
Filed Oct. 27, 1966, Ser. No. 590,055
Claims priority, application Japan, Nov. 6, 1965, 40/89,954
5 Claims. (Cl. 200—153)

ABSTRACT OF THE DISCLOSURE

Control switch for miniature type, motor-driven, optical instruments wherein two microswitches are stacked with the switch buttons thereof disposed on the same side, a motor-driven and manually settable rotatable control ring controlling the lens zooming or stop displacement being disposed on the side opposite to the switch buttons, and wherein a T-shaped lever having an arm extending across the stacked microswitches and extending switch actuating arms is provided to selectively engage the microswitches upon pivoting thereof by the engagement of the extending arm by one or the other of two spaced projections provided on the rotatable control ring; the arrangement being such to accommodate a switch control means within the minimum space requirements provided by optical instruments such as cameras and the like, and prevent damage to the microswitches.

---

The present invention relates to a switch control arrangement, and more particularly to a micro-switch arrangement for controlling the motors driving lens zooming mechanisms, distance adjustment mechanisms, or stop adjustment mechanisms, and the like, in optical instruments such as cameras.

Considering the small space available within a camera casing, whether it be a still camera or a movie camera, difficulty is encountered in accommodating the circuit elements which would provide a reliable and accurate positioning by a motor of the camera lens, distance indicator, stops or the like. It is not only necessary in instances of motor-driven cameras to provide a fine control of the motor operation, but one that is flexible enough to meet the conditions of practical use. Full advantage must be taken of the available space within the camera casing to provide a comparatively large radius of arc of movement for the circuit controlling elements, the elements being so positioned that an overriding control button should be so disposed in the camera casing to be readily actuated by the camera operator should the need arise during use. In the present invention it is desirable to use the known micro-switches mounted within the camera casing on one side and mount the switch operating elements at some distance therefrom. An overriding switch operated by a switch button extending through the camera casing may be disposed on any side of the casing providing it is conveniently positioned for use. Such a switch may also be disposed in the pistol-grip sometimes used with cameras.

The object of the present invention is to provide a switch control for motor driven, miniature type optical instruments, such as cameras, which is compact, rugged and simple in construction, and reliable and accurate in operation.

In accordance with the invention, a switch control is provided for motor driven, miniature type optical instruments, wherein a ring is rotatable between two extreme positions, a switch actuating member cooperating with said ring adapted to open selectively two normally closed switches when the ring is rotated to its extreme positions, parallel electrical circuits being provided including a common source of voltage, a motor adapted to rotate the ring being connected into the circuits, each circuit including one of the two switches, and a double-pole, double-throw switch to connect the circuits selectively to the voltage source, the direction of rotation of said ring being determined by the coincident closed condition of one of the two switches and the closed connection through the double-pole, double-throw switches to the voltage source. The two switches are micro-switches each having an operating button, the micro-switches being so arranged that the operating buttons are positioned on the same side, the switch actuating member being a T-shaped member rotatable about an axis equidistant from the operating buttons and formed with an extended arm and two arms extending transversely therefrom, each arm being adapted to engage an operating button upon rotation of the T-shaped member, the rotatable ring being provided with two peripherally spaced projections adapted to abut the extended arm when the ring is rotated to an extreme position to rotate the T-shaped member to engage an operating button of one of the micro-switches. The ring is formed with an arcuate slot, a fixed pin cooperating with the slot to limit the rotation of the ring between its extreme positions, the angle subtended by the two spaced projections on the ring being less than the angle subtended by the ends of the arcuate slot.

The present invention will be more fully understood from the following description with reference to the drawing, in which:

FIG. 3 is a circuit diagram incorporating the microswitches, while

Figure 1:
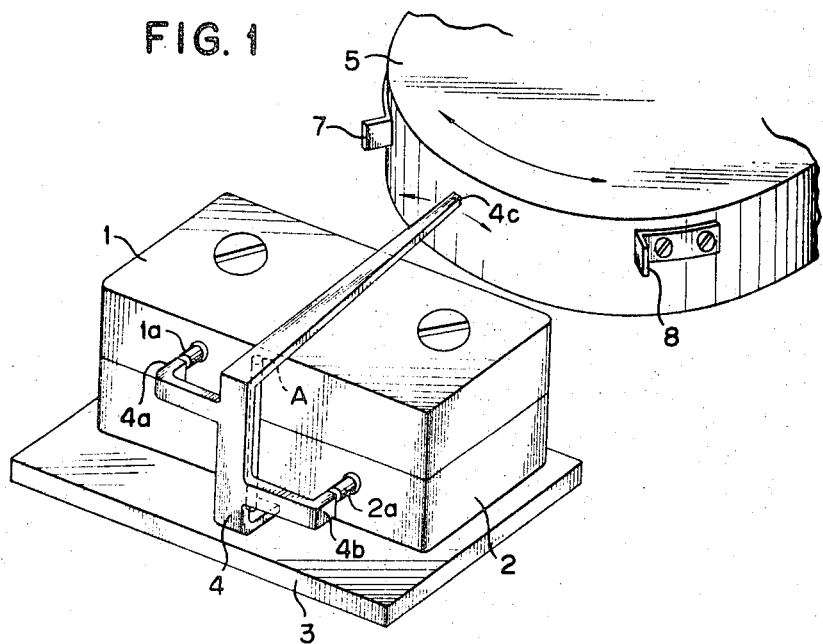
FIG. 1 is a perspective view of one embodiment of the invention showing only the essential elements in association with a lens barrel by way of illustration.
Figure 2:
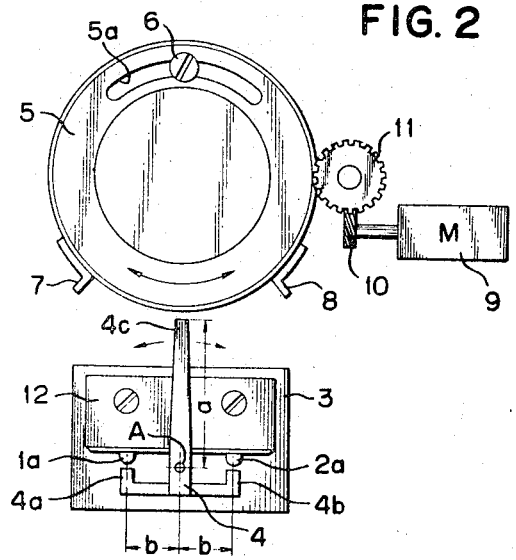
FIG. 2 is a top plan view of FIG. 1.

Referring now to the drawings, two normally closed micro-switches 1, 2 of known construction, are provided with buttons 1a and 2a, spring contacts 1b and 2b, respectively, to open the respective micro-switches when depressed. The two micro-switches are preferably stacked as illustrated, and secured to a base plate 3, the buttons 1a and 2a being in spaced relationship. A T-shaped actuating member 4 is pivoted about axis A on the base plate 3 equidistant from the buttons 1a and 2a, the member 4 being formed with two oppositely extending arms 4a and 4b adapted to engage the micro-switch buttons 1a and 2a, respectively. The T-shaped member 4 is further formed with an arm 4c which is at right angles to the button engaging arms 4a, 4b and extends over and across the stocked microswitches 1, 2. The arm 4c is adapted to be abutted by the projections 7 and 8, as will hereinafter be described. It should be noted that the length b of arms 4a and 4b, i.e. the distance between the axis A and the two switch buttons 1a, 2a (FIG. 2) is less than the distance a between the axis A and the abutting operation of the extended arm 4c. This is to avoid excessive force from being applied to the buttons 1a or 2a, as will hereinatfer be apparent.

In the example illustrating the present invention, an adjustment, or control ring 5 is provided for carrying out such operations as lens zooming adjustment, distance-adjustment or stop adjustment, and the like. The ring 5 is rotatably through a predetermined range of operation determined by means of an arcuate slot 5a and a fixed pin 6 cooperating therewith. The adjustment or control ring 5 is devised to position or adjust the zoom lens, the distance adjustment, or stops directly or indirectly by conventional means such as a helicoid, a lead cam or the like. The projections 7 and 8 are the switch abutment members fixed on the periphery of the control ring 5, the angular spacing therebetween being smaller than the angular distance of the slot 5a, for purposes hereinafter appearing.

Figure 3:
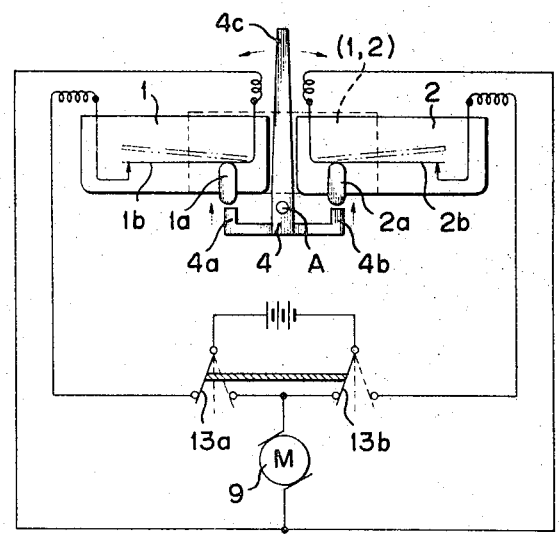

A reversible motor 9 is provided for control by the micro-switches 1, 2; the motor being connected to drive the ring 5 through suitable gearing 10 and preferably through a friction drive wheel 11 which also permits manual operation of the ring 5. The motor 9 is connected into an electrical circuit as illustrated in FIG. 3 comprising two parallel branches having a common voltage source 12 and a reversing switch 13 provided with two ganged double-pole switches 13a and 13b for selectively reversing the rotation of the motor. While not illustrated, it will be apparent that the actuating member for the reversing switch 13 may extend out through the camera casing for actuation by the operator for the purposes hereinafter described, or it may be disposed in the pistol-grip.

Figure 4:
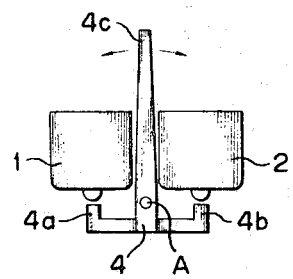
FIG. 4 is a view similar to FIG. 2 of a second embodiment of the invention.

In FIG. 3, the two micro-switches 1 and 2 are illustrated as being side-by-side and spaced apart from each other as shown in solid line. In practice, the two micro-switches could be stacked, as described, depending on space availability or may be secured as illustrated in FIG. 4, in a vertical position with the arms of the T-shaped member extending over the switch casings.

From the foregoing description, it will be apparent that when the ring 5 is rotated, the arm 4c of the T-shaped member will be abutted by either of the projections 7 or 8, depending upon the direction of rotation to open microswitch 1 or 2 at approximately the end of the operational range determined by the pin 6 and slot 5a. The motor operation is cut-off by the opening of the micro-switches before the ends of the slot 5a abut the pin 6. Pin and slot 5a serve to prevent excessive force from being applied to the microswitches to prevent damage during manual operation of the ring 5 with the switch 13 at its neutral position. Because the distance b of the T-shape member is less than the distance a, the stroke of the extended arm 4c by the ring 5 is changed into a much smaller stroke to cause actuation of the switch buttons 1a, 2a ring projections. When the direction of the rotation of the ring 5 and the setting of the switch 13 coincide, the motor circuit is opened at the corresponding position, and rotation of the ring 5 automatically stops. When the switch 13 is switched over to the opposite or reverse position, the motor 9 rotates in the opposite direction to rotate the ring 5 in the opposite direction again. It is possible to stop the rotation of the ring 5 in an intermediate position by merely opening the switch 13, in which case the motor circuit is open. Thus, in addition to the extreme positions determined by the opening of the micro-switches, it is possible that various kinds of adjustments such as zooming adjustment or the like can be attained by use of the present invention.

When a unidirectional motor is used in place of the reversible motor, it is preferable to build the reversible switching mechanism utilizing gears or the like into the transmission mechanism 11, and to interlock the switching operation of this mechanism to the operation of the reversing switch 13.

In accordance with the present invention, there is thus provided a simple, reliable, and extremely compact switch arrangement for the control of an electric motor drive especially adapted for incorporation into an optical instrument casing such as a camera. Modifications of the above described invention will occur to those skilled in the art within the scope of the present inventive concepts which is to be derived solely from the appended claims.

What is claimed is:

1. A control switch for motor-drive miniature type optical instruments, comprising two micro-switches each having an operating button for actuation of the switch contacts, the micro-switches being so arranged that the switch operating buttons are positioned on the same side, a rotatable control ring for instrument setting operation positioned on the side opposite the switch buttons, a T-shaped member pivotable about an axis equidistance from and on the same side with the switch buttons and formed approximately at the pivotal axis with an extended arm and two arms extending transversely therefrom adapted to engage the switch buttons, the extended arm extending across the microswitches toward the control ring, and two peripherally spaced projections on said ring adapted to abut the extended arm of the T-shaped member to pivot the member and selectively engage the transverse arms with their respective switch buttons to actuate the microswitches upon rotation of the ring, the length of the extended arm from the pivotal axis to the abutment end being longer than the length of the transversely extending arms from the pivotal axis to the switch buttons.

2. A control switch according to claim 1, wherein a drive wheel frictionally engages the periphery of the control ring to rotate the ring, the frictional engagement of the drive wheel and ring permitting manual operation of the ring, and means for limiting the rotational range of the ring by the drive wheel to a smaller arc than the rotational range of the ring during manual operation.

3. A control switch according to claim 1, wherein a drive wheel frictionally engages the periphery at the control ring to rotate the ring, a motor for rotating the drive wheel, an electrical circuit including a voltage source and the two microswitches for controlling the operation of the motor, the frictional engagement of the drive wheel and ring permitting manual operation of the ring, and means for limiting the rotational range of the ring by the driving wheel to a smaller arc than the rotational range of the ring during manual operation.

4. A control switch according to claim 2, wherein said limiting means comprises a fixed pin cooperating with an arcuate slot on said ring, the angle substanded by the two spaced projections on said ring being less than the angle substanded by the ends of said arcuate slot.

5. A control switch according to claim 3, wherein the electrical circuit includes two parallel circuits connected to the voltage source and the motor with one of the micro-switches in each circuit, and a double pole, double throw switch for connecting the parallel circuits selectively to the voltage source, the direction of rotation of the motor being determined by the coincident closed condition of one of the two microswitches and the closed connection of the double pole, double throw switch.

References Cited

UNITED STATES PATENTS

| 2,464,998 | 3/1949 | Stevens | 200—153.15 |
| 2,548,809 | 4/1951 | Norman | 200—153.15 X |
| 2,801,308 | 7/1957 | Cubellis | 200—153.19 X |
| 2,816,187 | 12/1957 | Smith | 200—61.39 |

ROBERT K. SCHAEFER, *Primary Examiner.*

H. BURKS, *Assistant Examiner.*